Dec. 7, 1954   R. P. DUNMIRE   2,696,212
HYPODERMIC SYRINGE

Filed Sept. 28, 1951   4 Sheets-Sheet 1

INVENTOR
RUSSELL P. DUNMIRE
BY Evans + McCoy
ATTORNEYS

United States Patent Office 2,696,212
Patented Dec. 7, 1954

2,696,212

HYPODERMIC SYRINGE

Russell P. Dunmire, Chagrin Falls, Ohio

Application September 28, 1951, Serial No. 248,806

25 Claims. (Cl. 128—216)

This invention relates to devices for injecting fluids through membranes and particularly to devices for effecting subcutaneous injections of medicaments and the like into human beings and animals. While especially valuable for injecting medicaments, the devices of the invention have characteristics rendering them useful for a wide variety of other types of injection operations in industry and scientifc research.

The invention involves new injection devices and methods of making the same and, also, new techniques for effecting injections. Though in no way limited thereto, the invention principally relates to the provision of injection devices having the fluid to be injected sealed therein at the time manufacture of the devices is completed. Though it is contemplated that the devices will generally be discarded after being used to perform one injection, they may, of course, be saved for salvage of some or all of their component parts.

While it is always preferable that subcutaneous injections in human beings be prescribed by a qualified physician and be administered either by the physician or other trained and qualified person, there are many instances in which it is not practical to place such limitations on the subcutaneous administration of medicaments. For example, diabetics have commonly resorted to self-medication by subcutaneous injection of insulin, which many victims of this malady require at intervals too frequent for the normal precautions to be practical. Also, the prompt handling of epidemics, mass casualties in peacetime and wartime disasters, etc., occasionally demand more rapid administration of subcutaneous medicaments of one sort or another to human beings than can be accomplished alone by the trained and qualified personnel available.

Thus, there are numerous instances in which self-administration, or administration by relatively unskilled personnel, of injections to human beings is desirable or imperative. However, the requirements of proper cleansing and sterilization of the epidermis and of the injection apparatus, and careful measurement of the dose administered, render conventional hospital or laboratory apparatus and techniques awkward and cumbersome in the field. Accordingly, there is a great need for simpler equipment and techniques that are better adapted to meet such exigencies.

While many attempts have been made to satisfy this need, all of the devices proposed have had certain drawbacks or limitations that have greatly restricted their value and their versatility. The essential, or at least highly desirable characteristics include:

1. Simple and inexpensive construction permitting mass production at a reasonable cost.
2. Simple operation in use, permitting administration by persons having no special training or manual skill or dexterity.
3. Resistance to the effects of thermal expansion and contraction.
4. Resistance to great changes in atmospheric pressure
5. Availability in a sterile condition for prolonged periods of time without requiring resterilizing at the time of use.
6. Zero M. V. T. R. (moisture and vapor transmission rate) through the wall of the enveloping package.
7. Resistance to rough handling during transportation and use.
8. Provision for sterilizing the epidermis in the region of the injection.
9. Provision for protecting the punctured region of the epidermis from contact with infectious substances.
10. Ability to preclude entrance of infectious substances during the injection.
11. Operative in any position.
12. Resistance (of the device itself) to corrosion, rot, attack by fungus, etc.
13. Provision of means for positive later identification of the patient and of the character and amount of medication administered.

Insofar as I am aware, all of the devices heretofore proposed for administering medicaments subcutaneously have been seriously deficient in a number of these respects.

Briefly stated, the principal objects of the present invention are to provide injection devices in the nature of hypodermic syringes that more completely satisfy the above requirements than prior art devices, and to provide simple, economical, and efficient methods of making and using such syringes.

Devices made in accordance with the present invention are characterized by an outer protective shell enclosing both the fluid to be injected and an injection needle, the needle being either enclosed in the same compartment as the injection fluid or in a separate compartment within the outer shell, at least a portion of the outer shell being non-frangible and flexible to permit manual deformation of the fluid compartment, the parts being so constructed and arranged that the fluid compartment is ruptured or is punctured by the needle and the fluid flows through the needle when the fluid compartment is so deformed. A sterilizing liquid or ointment may be enclosed within the protective shell in various ways for convenient manual application to the epidermis prior to the injection, or for automatic application in the course of the normal operation of the syringe. Also, according to certain forms of the invention, various suitable means for identifying the recipients of injections and the nature of the injections may be provided as parts of the devices, which means may be separable therefrom for application after administration of the injections or operative automatically in the course of the normal operation of the syringes. The invention also contemplates the employment of special shapes, or colors, or both, in addition to ordinary legends, for identifying the fluid contents of the syringes and for performing various functions designed to avoid confusing ampoules or syringes containing one kind or quantity of medicament or other fluid with those containing a different kind or quantity.

The methods of manufacturing devices embodying the invention involve various molding, sealing, and dipping operations and special techniques for holding parts of complete devices in the desired relationship during their final assembly and the application of one or more layers of protective enveloping materials and the like thereto.

The foregoing and numerous additional objects, features, and advantages of the invention, and various illustrative constructions and techniques for making and using them will become apparent and more fully understood from the following detailed description of the invention, and from the accompanying drawings in which:

Figures 1, 2:
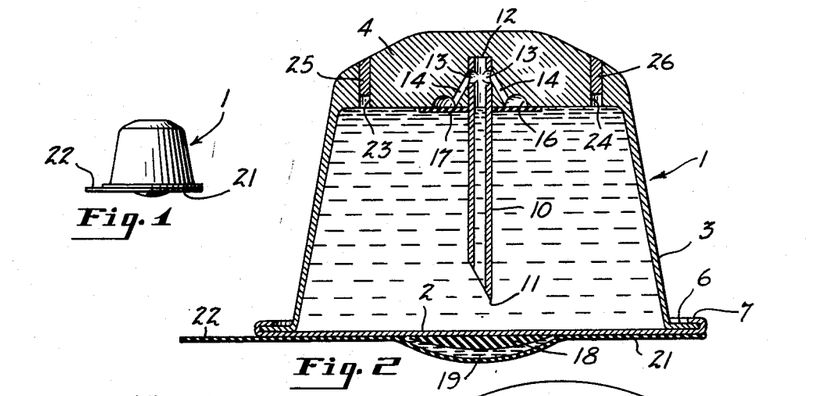
Figure 1 is an elevational view, approximately actual size as printed in the patent, of a disposable hypodermic syringe embodying the invention.
Fig. 2 is an enlarged vertical section through the center of the device of Fig. 1.
Figures 3, 4, 5:
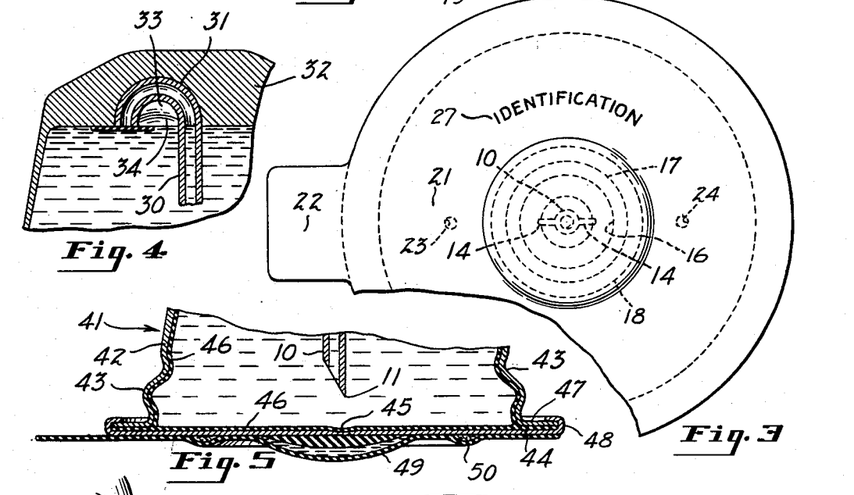
Fig. 3 is an enlarged, fragmentary, plan view of the bottom or injection end of the device of Fig. 1.
Fig. 4 is a fragmentary view similar to Fig. 2 showing a different mounting of a hypodermic needle in an otherwise similar device.
Fig. 5 is a fragmentary view similar to Fig. 2 showing a modified arrangement for identifying the recipient of an injection.

Referring now to the form of the invention illustrated in Figs. 1 to 3, the syringe is completely contained within a shell 1 having the general form of an inverted cup closed at the lower end by a thin, transverse, bottom wall or partition 2 having a conical side wall 3, preferably tapering in thickness from a relatively very thick top wall 4 to the thin bottom wall 2. The thinner end of the side wall 3 of larger circumference may be flanged outwardly to provide a flat, annular flange 6 adapted to be joined firmly to the margin of the bottom wall 2 so as to form a moisture proof and gas proof sealed joint.

The inverted cup 1 and the transverse bottom wall 2 may suitably be made of aluminum. In this case, the margin 7 of the bottom wall 2 is preferably folded upwardly and then inwardly around the flange 6 of the cup, and the three layers united by cold pressure welding in accordance with well-known techniques. Alternatively, the cup 1 and bottom wall 2 may be made of various synthetic plastic materials or the like, with a suitable sealing material employed to unite the three layers of the joint between the cup and bottom wall.

A hypodermic needle 10, preferably having a pointed lower end 11 and a square or blunt butt end 12, is disposed entirely within the cup 1 with its butt end centrally embedded in the thick top wall 4 of the cup. The needle is adapted to be projected through the thin bottom wall 2 of the shell in the manner hereinafter described.

To provide openings for access of liquid from the inside of the shell into the bore of the needle adjacent the butt end thereof, the side of the needle adjacent the butt end may be cut away, preferably at diametrically opposite points 13, and passages 14 may be formed through the thick wall 4 from the inside surface thereof to the cut-away openings 13. The passages 14 may, if desired, lead toward the openings 13 from an inner annular channel 16 formed in the thick wall 4.

For the purpose hereinafter explained, a thin, fluid impervious diaphragm 17, made of material that is easily rupturable when subjected to mild pressure from within the shell 1, may be disposed over the channel 16 and sealed to the inner surface of the thick wall 4 to prevent flow of fluid from inside the shell into the butt end of the needle until the diaphragm 17 is ruptured.

The center of the bottom wall 2 is preferably covered on the outside by a layer 18 of soft rubber, polyvinyl butyral, or the like, which may be adhered in place and will be easily penetrated by the pointed end 11 of the hypodermic needle. The purpose of this layer 18 is to seal around the needle to prevent fluid escaping from inside the shell around the outside of the needle. The sealing layer 18 may be covered in turn by a layer 19 of an antiseptic ointment, and both may then be covered by a sheet 21 of fabric or plastic material having a pressure sensitive adhesive coating (not shown) on its upper surface to adhere it to the bottom wall 2 of the shell entirely around the central layers 18 and 19 thereon. The sheet 21 may be of the same shape and size as the bottom wall of the shell, but preferably has a tab 22 projecting from the margin thereof to be grasped by the fingers for stripping this sheet from the device as the first step in its use.

The shell 1 may be completely filled with fluid to be injected by any of several practical filling operations. For example, if the shell is made of aluminum and the fluid is not of an oily character, the cup-shaped member carrying the needle 10 and the bottom wall 2 may be submerged in the fluid and cold welded together while submerged. Alternatively, whether the shell is made of plastic or metal, a pair of openings 23 and 24 may be provided in the thick wall 4 of the shell, one for introducing fluid and the other for exhausting air, the openings later to be closed by suitable plugs 25 and 26 after the shell has been filled. In this case, of course, the shell is completed with the bottom wall 2 joined to the side wall 3 before the filling operation, which facilitates making a strong joint therebetween.

Conventional cleanliness precautions should, of course, be employed during the manufacture of the syringe and the parts may be sterilized by any conventional technique just prior to the time of final assembly and before filling the syringe with the fluid to be injected. After filling, with the device completed and ready for packaging, I prefer that a final sterilization be effected by subjecting the filled syringe to ultra high frequency vibrations in accordance with well-known methods. Sterilization in this manner has been found to be highly effective, and, since it develops no appreciable amount of heat, it may be employed without harming any of the materials of which various parts of the syringe may be constructed, without causing thermal expansion that might distort or break any of the parts, and without any deleterious effect upon the fluid with which the syringe has been filled.

To provide additional protection against leakage after filling, and to provide an external surface more resistant to any kind of corrosion, mildew, fungus attack or the like, whatever the material from which the shell may be made, the completed and filled shell may be entirely coated, by dipping, spraying, or other suitable process, with a layer (not shown) of any desired exterior coating material to provide greater shell strength and additional protection for the shell and its contents.

The device is intended to be collapsed in the direction of its axis to force the needle 10 through the thin wall 2 into the patient, to rupture the diaphragm 17, and to force the fluid out of the shell through the bore of the needle. The side wall 3, being conical and tapering in thickness as described, will start to bulge outwardly adjacent the bottom wall 2 when pressure is applied to force the thick wall 4 toward the bottom wall 2. As the collapsing pressure is continued, deformation of the side wall will occur further and further upwardly toward the thick wall 4 until the walls 4 and 2 actually come together.

Though the device is exaggerated in size in Figs. 2 to 5, the wall thicknesses of the shell and other parts have been even further exaggerated for ease of illustration. In practice, the thicknesses of the various parts will vary with the materials of which they are made to permit the type of operation described.

Figure 6:
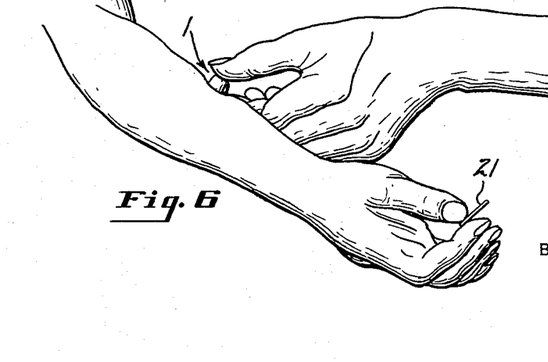
Fig. 6 is a perspective view illustrating the method of using the devices of Figs. 1 to 5.

Use of the device in the self administration of a right forearm injection is illustrated in Fig. 6. While holding the device in the left hand, the tab 22 is grasped between the thumb and forefinger of the right hand for stripping off the bottom layer 21 of adhesively coated sheet material. This exposes the ointment 19, part of which will stick to the sheet 21 and part to the sealing material 18.

While still holding the sheet 21 as shown, the bottom of the device is placed against the forearm where the injection is to be made, thus smearing some of the ointment 19 on the epidermis to render it safely antiseptic. The thumb of the left hand is then placed against the top of the shell and the shell is collapsed against the forearm by thumb pressure. This forces the needle 10 successively through the bottom wall 2, the sealing material 18, the ointment and the epidermis of the forearm.

Because the first part of the collapsing causes the shell to approach more closely to the shape of a sphere, the parts may be proportioned so that the point of the needle penetrates the epidermis before the volume of the shell is reduced so as to apply fluid pressure to the diaphragm 17 to burst it and permit the fluid to flow out through the needle. This minimizes any loss of fluid, substantially all of which flows out through the needle during the remainder of the collapsing of the shell with the needle penetrating the epidermis.

The thickness of the wall 4 permits it to be grasped readily at its edges between the thumb and forefinger for withdrawing the needle, whereupon the device may be discarded if desired. The adhesive coated sheet 21 is then taken in the left hand and applied as a bandage or covering for the area of the epidermis penetrated by the needle, the portion of the ointment 19 adhering to the center of the sheet 21 providing an antiseptic dressing.

For identification purposes when injections are being administered to large numbers of persons in instances of mass casualties, the exposed surface of the sheet 21 may be marked at the time the syringe is filled with an appropriate legend 27, or with color, or both, for identifying the injection fluid or medicament that has been administered. This will help to prevent accidental overdosing of any person by identifying each dose administered.

During or after assembling the needle 10 in the wall 4, it is desirable to run a wire through one passage 14, through the butt end of the needle, and out through the other passage 14 to be certain that the path for the flow of fluid into the needle is open. To avoid the necessity for this operation and to simplify the construction somewhat, a modified form of needle 30 may have a reverse bend 31 at its butt end as shown in Fig. 4. If the shell is made of metal, as shown, the interior of the thick wall 32 may conveniently be made with a groove 33 therein to receive the butt end of the needle. To secure the needle in position as shown, it is simply necessary to deform the metal of the wall 32 on opposite sides of the groove 33 inwardly as indicated at 34. If the shell is made of plastic material, for example, the groove may be filled with additional plastic material after the butt end of the needle has been placed therein to hold it in place.

A somewhat different shell construction is illustrated in Fig. 5 to provide greater expansibility of the shell to accommodate greatly reduced atmospheric pressures, such as are encountered at high altitudes, or high temperatures such as may be encountered in the tropics or in desert climates. This construction also illustrates how a suitable plastic material may be employed as an interior liner in instances in which the fluid may be reactive with aluminum or other metals.

As shown in Fig. 5, a metal shell 41, generally similar to that shown in Fig. 2, may have the thin end of the conical side wall 42 formed with a number of corrugations 43. In the event the interior pressure is raised by heat, or the exterior pressure is reduced, these corrugations may be straightened by the interior pressure to provide greater volume inside the shell without bursting the shell or causing leakage at the joints.

To provide for easier penetration of the thin bottom wall 44, the center of this wall, directly opposite the point 11 of the needle, may be reduced somewhat in thickness over a very small area, as shown at 45, without materially weakening the strength of the wall.

The shell illustrated in Fig. 5 has a continuous inner coating 46 of a suitable plastic material that may be applied in any desired manner to the interior of the cup-shaped member, to the lower surface of the flanges 47 thereof, and to the upper surface of the thin bottom wall 44. The cup-shaped shell and the thin bottom wall may be assembled before filling the device by bringing them together and applying heat to the contacting plastic surfaces to seal them together and, in effect, create a continuous coating over the entire inner surface of the closed shell. The outer periphery 48 of the metallic bottom wall 44 may be crimped upwardly and over the flange 47 of the cup-shaped shell to provide a stronger joint.

Instead of relying solely upon legends printed on the adhesively coated sheet material 21 of the device of Figs. 1–3 to identify patients that have received injections and the medicament with which they have been injected, a harmless vegetable dye may be incorporated in the ointment 19, or, alternatively, a suitable marking device may be incorporated between the metallic bottom wall 44 and an adhesively coated outer bottom layer of sheet material 49. This marking device may comprise an annular ring 50 of felt, sponge rubber, or similar soft and absorbent material adhered to the thin metallic bottom wall 44 and then impregnated with a fluid ink or dye. When the outer bottom layer of adhesively coated material 49 is stripped from the device, the ink impregnated annular ring 50 is exposed and contacts the epidermis completely around the point of injection, thus branding the patient automatically as the injection is made in the manner described above. For greater visibility and distinctiveness, luminous or fluorescent inks or dyes may be employed and different colors may be selected to identify different specific injection fluids.

In other respects the device of Fig. 5 may be identical with the construction shown in Figs. 2 and 3 and is intended to be employed in the same manner and to have the same general mode of operation.

Referring now to the form of the invention illustrated in Figs. 7–11 inclusive, there is shown an applicator 60 of the duplex or double acting type adapted to receive a collapsible ampoule in each end thereof. The applicator 60 may be constructed in a variety of ways, and one such construction is shown in detail in Figs. 7–8 for illustrative purposes.

Figures 7, 8, 9, 10, 11:
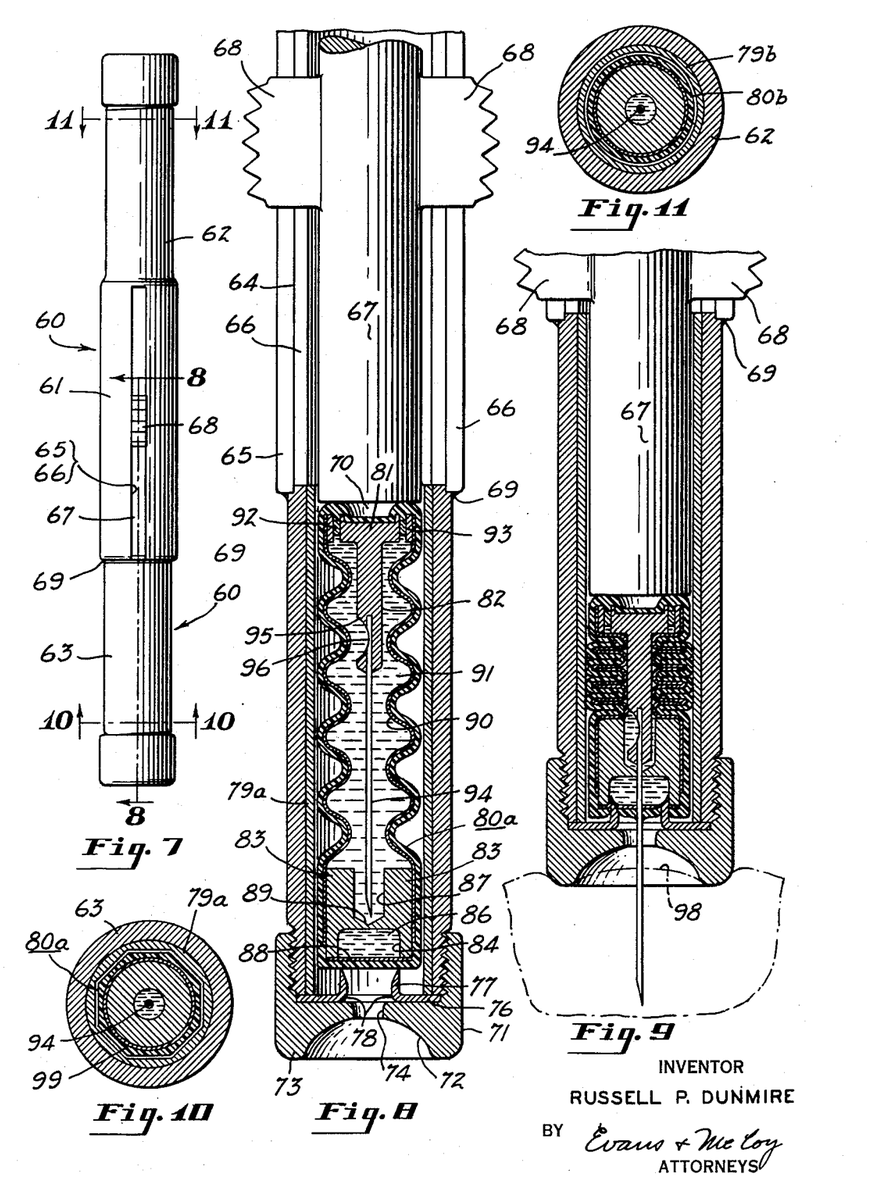
Fig. 7 is an elevational view, approximately actual size as printed in the patent, of a double acting or duplex applicator for receiving and operating disposable hypodermic syringes of a somewhat different form from those shown in Figs. 1 to 6.
Fig. 8 is a fragmentary, vertical or longitudinal section through the center of the applicator of Fig. 7, showing a disposable hypodermic syringe, also in section, disposed therein in its manufactured condition.
Fig. 9 is similar to Fig. 7, but shows the parts of Fig. 7 just as a subcutaneous injection has been completed and before withdrawing the hypodermic needle from the patient.
Fig. 10 is a transverse sectional view through one end of the applicator of Fig. 7 with a disposable hypodermic syringe disposed therein, the plane of the section being indicated by the line 10—10 in Fig. 7.
Fig. 11 is another transverse sectional view through the opposite end of the applicator of Fig. 6, with a differently shaped disposable hypodermic syringe disposed therein, the plane of the section being indicated by the line 11—11 in Fig. 7.

In the embodiment illustrated, the applicator 60 may comprise a tubular center section 61 and an integrally formed tubular end section 62 of slightly reduced diameter. The opposite end may be a separately formed tubular section 63, substantially identical in dimensions with the end section 62, having an integral extension 64 telescopically received within the center section 61. The center section has a pair of diametrically opposite, longitudinal slots 65 cut therein from the free end thereof almost to the opposite end. The extension 64 of the end section 63 is similarly slotted in the opposite direction at 66, the slots 65 and 66 being diametrically aligned.

A cylindrical ram 67, having a pair of diametrically opposite fins 68 projecting radially therefrom, is slid into the center section 61 with the fins 68 projecting out through the slots 65, whereupon the extension 64 on the end section 63 is telescoped with the center section 61 and joined thereto by a circumferential weld 69 to form substantially identical syringe receptacles at opposite ends of the center section 61 with the ram 67 normally disposed therebetween. The outer edges of the fins 68 may be serrated or knurled for easy gripping with the fingers to slide the ram 67 in either direction into the syringe receptacles. Both ends of the ram are preferably provided with terminal bosses 70 (only one being shown) conforming to similarly shaped recesses in the ends of the syringes against which the ram will bear.

The end section 63, shown in detail in Fig. 8, is externally threaded at its open end to receive an internally threaded cap 71 having a concavity 72 in the outer end face thereof surrounded by an annular rim 73, and having an axial opening 74 therethrough. A thin disc 76 having its center punched out to form a pair of inwardly projecting prongs 77 is attached, as by welding at 78, to the inner end face of the cap 71.

A sleeve 79a having a circular, outer, cross-sectional outline and, for example, an octagonal, inner, cross-sectional outline is slid into the end section 63 to provide a desired inner cross-sectional configuration for receiving a syringe 80a having a corresponding cross-sectional configuration at one or both ends thereof.

The opposite end of the applicator is identical with the end described above except that it may contain a sleeve 79b having, for instance, a circular, inner, cross-sectional outline to receive a syringe 80b having a corresponding cross-sectional configuration at one or both ends thereof. By properly dimensioning the sleeves 79a and 79b and the syringes 80a and 80b, each syringe will fit only in the receptacle of matching cross-sectional configuration.

Except for their cross-sectional configurations at one or both ends, the syringes 80a and 80b may be identical, and only one of them need be described in detail.

Referring to Figs. 8 to 10, the syringe 80a may comprise an aluminum disc 81 having an elongated, axially extending, central boss 82 integrally formed thereon to hold a hypodermic needle. The opposite end of the syringe may include an aluminum member 83 having a well 84 formed in the outer end thereof that may contain an antiseptic fluid 86, preferably containing a suitable dye, and a well 87 formed in the inner end thereof and shaped to receive the end of the boss 82 when the syringe is collapsed. The well 84 may be closed by a very thin aluminum disc 88 cold welded to the member 83 around the periphery of the disc. The common wall 89 between the well 84 and the well 87 is reduced in thickness at its center sufficiently for the pointed end of a hypodermic needle to be easily punched therethrough.

A thin, aluminum, bellows-like, tubular shell 90 may surround and be cold welded at one end to the disc 81 and at its opposite end to the member 83 to form a reservoir for an injection fluid 91. The fluid 91 may be charged through an opening in the disc 81, that may be closed thereafter by a plug 92, while air is exhausted through a second opening in the disc 81, that may be closed thereafter by swedging or by a plug 93.

A hypodermic needle 94 is disposed inside the shell 90 with its butt end firmly held in the boss 82 and its pointed end surrounded by the wall 87 and disposed close to the thin wall 89. An opening from the interior of the shell 90 into the butt end of the needle may be provided in any desired manner. As shown, one side of the boss 82 may be cut away at 95 to expose an opening 96 in the side wall of the needle. When the syringe 80a is collapsed longitudinally to the condition shown in Fig. 9, as permitted by the corrugations in the bellows-like shell 90, the needle is forced to penetrate the wall 89 and is projected out through the aperture 74 and into the epidermis 98 of a patient. At the same time, the injection fluid 91 may flow through the needle from the opening 96.

After the syringe 80a has been assembled as described with the antiseptic fluid 86 and injection fluid 91 therein, it may be coated over its entire outer surface with a layer 99 of a suitably flexible and impervious plastic material. As shown in Fig. 10, this material may be molded around the member 83 and, if desired, around the disc 81 to provide the octagonal outer cross-section, or to provide the circular, outer cross-section shown in Fig. 11.

The applicator may be loaded by removing the caps 71 at both ends and inserting the appropriately shaped syringes 80a and 80b and then replacing the caps. Assuming that two successive injections are to be made, first one from the syringe 80a and then one from the syringe 80b, the end section 63 is first positioned against the patient as shown in Fig. 9. The rim 73 on the end of the applicator is pressed against the epidermis and forces it to bulge inwardly into the concavity 72 as shown. The plunger 67 is forced in that direction by manually gripping and moving the fins 68 on the plunger. This first moves the syringe in the same direction, causing the prongs 77 to puncture the plastic coating 99 and thin disc 88 and permitting the antiseptic fluid to flow onto the epidermis within the confines of the rim 73. The fluid 86 sterilizes the area in which the injection is to be made and also stains or dyes the epidermis in that region for later identification of patients who have received injections and the type of injection received. Further movement of the plunger then collapses the syringe as shown in Fig. 9, forcing the needle 94 through the thin wall 89 and the opening 74 into the epidermis and forcing substantially all of the injection fluid through the needle and into the patient.

Upon withdrawal of the applicator, the needle is also withdrawn, whereupon the applicator may be reversed end for end, and a second injection of fluid from the syringe 80b may be made in the same manner.

Finally, the caps 71 may be removed, and the projecting needles 94 may be grasped for pulling out the used syringes. The used syringes may be discarded or saved for salvage as desired.

Though not shown in the drawing, it is contemplated that the exterior cross-sectional configuration of the applicator end sections 62 and 63 may be made to conform with the cross-sectional configuration of the syringes respectively receivable therein for distinguishing one end of the applicator from the other after loading. In conjunction with this expedient, or as an alternative, suitable marking with numerals, legends, or colors, including fluorescent and luminescent coloring or coating compositions, may be employed.

Figures 12, 13:
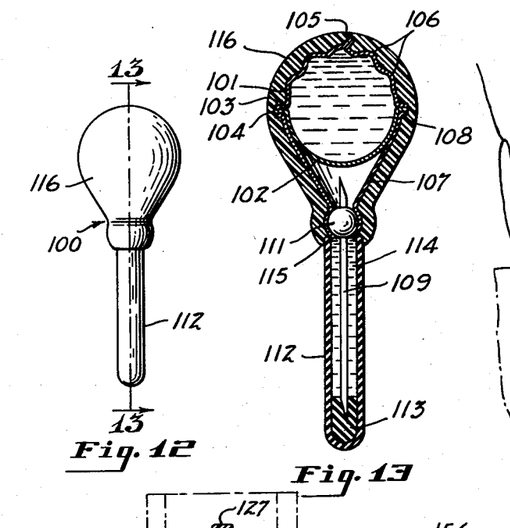
Fig. 12 is an elevational view of still another form of disposable hypodermic syringe requiring no applicator.
Fig. 13 is a vertical or longitudinal section, on an enlarged scale, of the device of Fig. 12, the plane of the section being indicated by the line 13—13 of Fig. 12.
Figure 14:
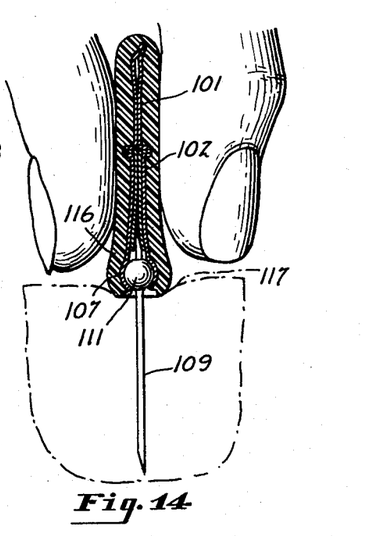
Fig. 14 is a view similar to Fig. 13, but showing the device just as a subcutaneous injection has been completed and before withdrawing the hypodermic needle from the patient, and illustrating how the medicament ampoule was manually collapsed during the injection.

Figs. 12–14 show another modification of the invention and illustrate its operation in use. As best shown in Fig. 13, the syringe, generally designated 100, comprises a generally spherical ampoule that may be conveniently formed from a pair of flanged, generally hemispherical shells 101 and 102 of thin aluminum or the like. The shells may be joined where their flanges 103 and 104 meet by cold welding the flanges together with the shells submerged in the injection fluid to form and fill the ampoule simultaneously. Alternatively, one of the shells 101 may be formed in the shape of an inverted funnel to provide a small-neck opening for filling the ampoule after the two shells have been joined together, whereupon the small neck of the opening may be pinched closed and sealed, as shown at 105, by cold welding. To permit expansion of the ampoule when subjected to internal expansive forces of the type mentioned above, one or both of the shells may be formed with corrugations therein, as shown at 106.

Simultaneously with the joining of the two shells 101 and 102, or thereafter, a generally funnel-shaped shell 107, preferably made of the same thin metal as the shells 101 and 102 and having a flange 108 about its large upper end, may be joined to the ampoule, as shown, by cold welding the flange 108 of the member 107 to the flange 104 of the shell 102.

A hypodermic needle 109, pointed at each end, is provided with an enlargement 111 formed thereon adjacent one end thereof; and the small end of the funnel-shaped member 107 is slipped over this enlargement, is deformed to fit snugly about the enlargement, and is cold welded, cemented, soldered, or otherwise secured and sealed thereto to form a tight and leakproof joint. In this manner, the needle and ampoule may be temporarily held in the relationship illustrated in Fig. 13.

A deeply cupped container 112, preferably formed of a relatively rigid, heat sealable, plastic material, is provided with a plug 113 of soft rubber or the like forced into the container to the bottom thereof with a tight enough fit to resist removal. Alternatively, the plug 113 may be formed integrally with the cup 112 or heat sealed thereto. The cup 112 is filled, or substantially filled, with a suitable sterilizing liquid 114, preferably containing a suitable dye, and then the long, exposed portion of the needle 109 is inserted into the cup 112 until the point thereof is embedded well into the plug and the rim of the cup is seated snugly against the enlargement 111 of the needle, or against the lower end of the funnel-shaped member 107 enveloping the needle enlargement 111.

As a final step in the production of the filled syringe, an outer envelope 116 of flexible plastic material is molded or otherwise formed around the ampoule and the funnel-shaped member 107 and is heat sealed at 115 around the rim of the cup 112 to prevent leakage from the cup and to provide a continuous plastic layer enclosing the ampoule for additional protection of the injection fluid from leakage and contamination from exterior influences.

When employing this form of the invention, it is first grasped about the enlargement 111, and the cup 112 is twisted to break the seal 115 at its upper end and permit its removal. The sterilizing liquid 114 is poured from the cup over the epidermis 117 where the injection is to be made to provide the desired antiseptic and sterile condition of the epidermis. While grasping the syringe about the enlargement 111 between the thumb and forefinger, the needle is inserted through the epidermis in a conventional manner. Thereupon, the ampoule is squeezed from opposite sides between the thumb and forefinger. This first distorts the ampoule toward the adjacent pointed end of the needle, punctures the shell 102 and releases the injection fluid. Then, as the ampoule is completely collapsed to the condition shown in Fig. 14, the injection fluid is forced through the needle and into the patient. The needle may then be withdrawn and the syringe discarded or saved for salvage.

Figures 15, 16, 17:
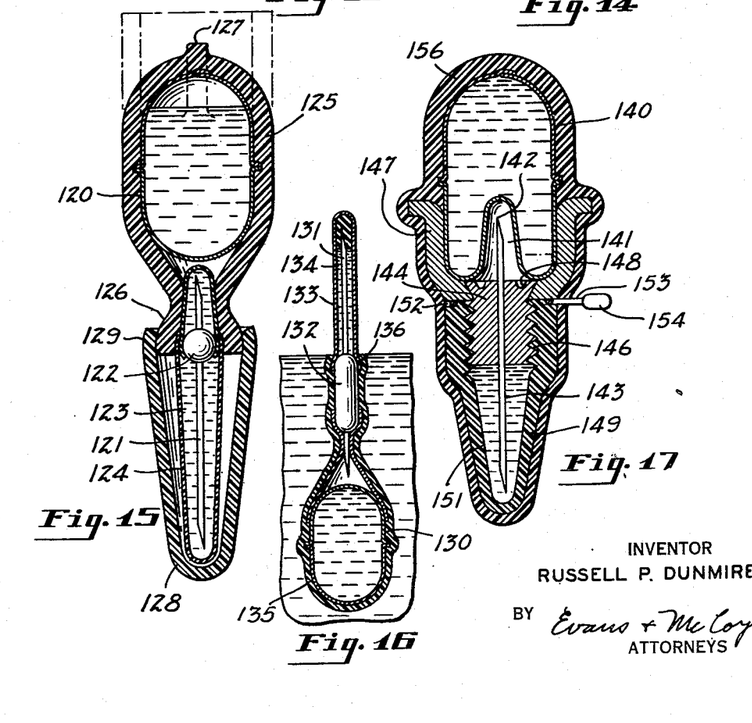
Fig. 15 is a vertical sectional view similar to Fig. 13 but showing another modification of the invention.
Fig. 16 is a vertical sectional view of still another modification of the invention, the device being shown during the final step in its manufacture.
Fig. 17 is a vertical sectional view of still another modification of the invention.

Fig. 15 shows a variation of the same general construction as the one shown in Figs. 12–14. In this embodiment of the invention, the ampoule 120 is elongated longitudinally of the syringe but is otherwise generally similar in construction to the ampoule in Figs. 12–14. A similar needle 121, having an enlargement 122, is completely surrounded by a sterilizing liquid 123 enclosed within a thin envelope 124 of a suitable plastic film, shown as made of upper and lower portions overlapped and joined together around the enlargement 122. A premolded shell 125 of rubber or heat sealable plastic material is shaped at one end 126 to fit snugly around one end of the plastic envelope 124 and the enlargement 122 of the needle with the opposite end of the shell completely open as indicated in phantom outline. The small end 126 of the shell 125 may be expanded in a well-known manner to permit the needle 121 and envelope 124 to be inserted without rupturing the envelope. The ampoule 120 is then inserted through the open end of the shell 125, whereupon the open end of the shell is closed and sealed along a seam 127, preferably by employing a self trimming mold. Finally, a protective shell 128, preferably formed of relatively rigid, heat sealable, plastic material, is slipped over the exposed portion of the envelope 124, and the open end 129 of the shell 128 is deformed under heat and moderate pressure to fit it snugly around the adjacent end 126 of the shell 125 and seal it thereto.

When employing this form of the invention, the shell 128 is first twisted off. The needle is then inserted by forcing it through the lower end of the envelope 124 and into the epidermis in one motion, permitting the sterilizing fluid 123 to flow over and around the area of the epidermis in which the needle is inserted. Upon squeezing the ampoule 120 from opposite sides, the ampoule 120 is first deformed longitudinally toward the adjacent pointed end of the needle 121, forcing the needle to penetrate the upper end of the envelope 124 and the wall of the ampoule and release the injection fluid. Complete collapsing of the ampoule in the same manner as shown in Fig. 14 then forces the injection fluid through the needle and into the patient.

Fig. 16 shows a syringe generally similar to that illustrated in Figs. 12–14, but including an elongated metallic ampoule 130 and a modified needle 131. In this case the enlarged portion 132 of the needle is also elongated to provide greater length in that region for grasping and manipulating the device. In other respects, this form of the invention is constructed in substantially the same manner as the device of Figs. 12–14 up to the time the cup 133 is applied. In this case, the cup 133 is shown as made of metal. The open end of the cup 133, while the cup is filled with an antiseptic fluid or ointment 134 and held in an upright position, is fitted around the enlargement 132 of the needle and sealed thereto with the aid of a cement (not shown) disposed therebetween. The device is then inverted, and a final coating 135 around the ampoule 130, around the adjacent end of the needle 131, and around the sealed end 136 of the cup 133 is applied by dipping the device as shown.

The device of Fig. 16 is used in the same manner as the device of Figs. 12–14.

Fig. 17 shows another syringe that is constructed along the same general lines as the syringe of Figs. 12–16 but includes a number of variations in its construction details. In this device an ampoule 140 of thin aluminum or the like is constructed similarly to the ampoule of Fig. 15, except that the lower half of the ampoule shell is deformed upwardly at its center to provide an inverted cup-shaped well or indentation 141 receiving and surrounding the adjacent pointed end 142 of a needle 143. The needle 143 is surrounded between its ends by a relatively heavy collar 144 that is externally threaded at 146 over the major portion of its length. The end of the collar toward the pointed end 142 of the needle is seated and secured in an aperture in the bottom of a cup-shaped yoke 147, this end of the collar 144 being swaged at 148 to expand it and anchor it rigidly in the yoke 147. A protecting shell 149, that may be made of a relatively rigid plastic material or metal, as desired, is internally threaded at its upper end and is filled with an antiseptic fluid 151 and screwed onto the threaded portion 146 of the collar 144. The upper end of the protecting shell 149 is formed with a shallow annular notch 152 around the rim thereof to receive a string 153 that is looped entirely around the upper end of the shell with one end of the string, having a knot or ball 154 thereon, extending freely outwardly to be grasped with the fingers. The entire device may then be dipped or otherwise coated with a suitable outer plastic coating 156.

This form of the invention is used by first grasping the knot or ball 154 on the free end of the string 153 and pulling it to break the plastic coating 156 entirely around the joint between the protecting shell 149 and the yoke 147. The shell 149 is then unscrewed and the antiseptic contents 151 thereof poured on the epidermis where the injection is to be made. While grasping the syringe about the yoke 147, the needle is inserted into the patient and the ampoule 140 is collapsed by pressing the thumb downwardly on the top thereof. This first forces the portion of the metallic ampoule shell opposite the pointed butt end 142 of the needle against the point thereof, thus puncturing the ampoule and permitting the injection fluid to flow through the needle and into the patient as the collapsing of the ampoule is completed by continuing the downward pressure thereon.

Figures 18, 19, 20, 21:
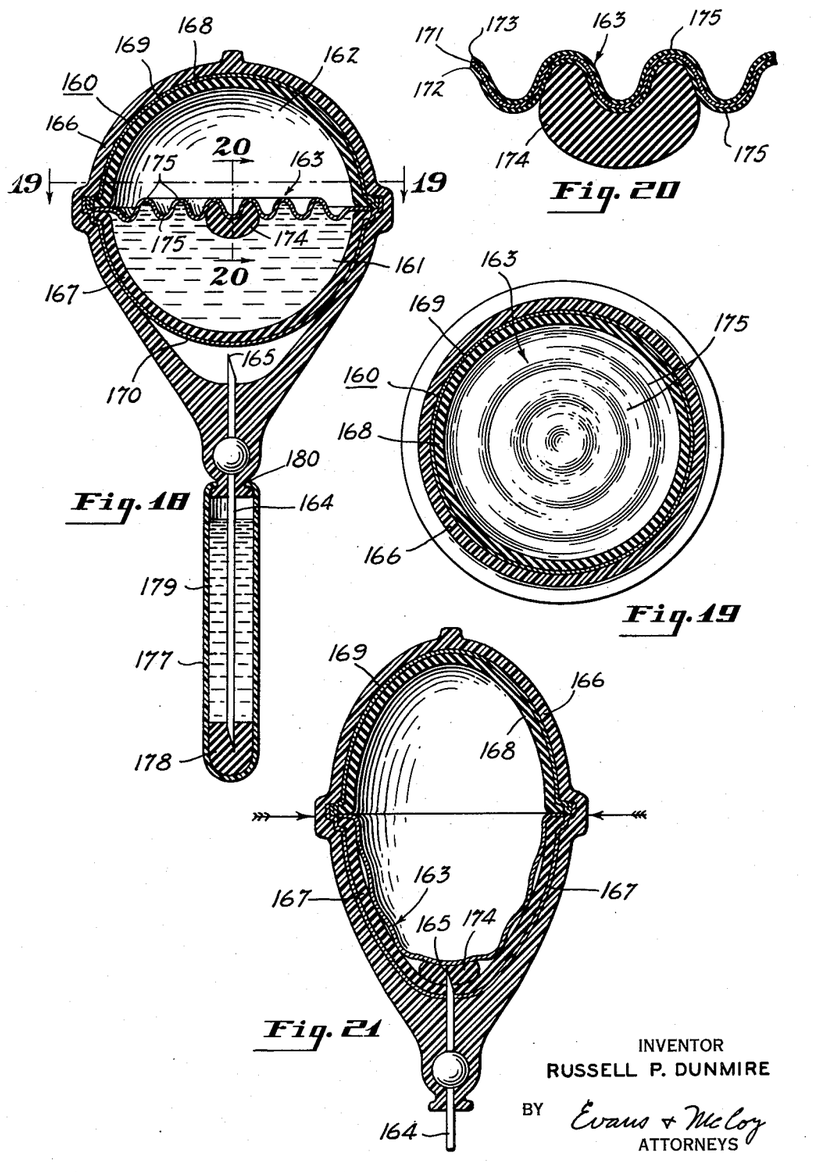
Fig. 18 is a vertical sectional view of still another modification of the invention.
Fig. 19 is a sectional view of the device of Fig. 18, the plane of the section being indicated by the line 19—19 of Fig. 18.
Fig. 20 is a fragmentary sectional view of the device of Fig. 18, the plane of the section being indicated by the line 20—20 in Fig. 18.
Fig. 21 is a fragmentary view similar to Fig. 18 but showing the device partially collapsed in use.

Still another variant of the invention is illustrated in Figs. 18–20 in which use is made of a gas under pressure to assist in forcing an injection fluid from the syringe without permitting any of the gas to be discharged through the needle.

In this embodiment of the invention, a two compartment ampoule, generally designated 160, is formed and preferably first charged with the injection fluid confined in one compartment 161 and separated from a gas compartment 162 by an expandable, gas-impervious diaphragm 163. Then the gas compartment 162 is filled with any desired gas under pressure, whereupon the ampoule and a needle 164 may be assembled in a premolded, rubber or plastic, outer shell 166 in the same manner as the syringe of Fig. 15.

A preferred ampoule construction for a device of this character comprises a pair of flanged, hemispherical shells 167 and 168 that may be brought together with the periphery of the diaphragm 163 sandwiched therebetween, and the two shells and the diaphragm may then be firmly joined and sealed together by heat and pressure. If desired, at this point, the injection fluid may be injected into the compartment 161 therefor, and then the gas under pressure may be injected into or generated in the other compartment 162. Injections of fluid or gas into the compartments may be made by passing hypodermic needles through the shells 167 and 168 while exhausting air from the compartments through other needles inserted in the same manner. The butyl rubber, being self-sealing when the needle is withdrawn, will retain the injection fluid and gas after withdrawal of the needles, as is well-known. Thereupon, a pair of protective, hemispherical shells 169 and 170 of thin sheet aluminum may be disposed around the filled butyl rubber ampoule and sealed by cold welding along a circumferential seam.

Alternatively, the ampoule may be enclosed with an aluminum shell before being filled, with suitable apertures (not shown) formed in the aluminum shell to receive the filling needles and air exhausting needles. Such openings in the aluminum shell may have peripheral flanges adapted to be folded together and cold welded after the ampoule has been charged with injection fluid and gas, in the same manner as the shell 101 may be sealed at 105 in Fig. 13.

The diaphragm 163, diagrammatically shown as being of thin sheet metal in Figs. 18 and 21, is preferably a laminated sheet composed of three layers of material, as illustrated in cross-section on a larger scale in Fig. 20. The central layer 171 may be of thin sheet aluminum and the top and bottom layers 172 and 173 may be made of the same butyl rubber or the like as the shells 167 and 168. In addition, a protecting pad 174, preferably made of a relatively harder rubber less easily penetrated by the pointed butt end 165 of the needle 164, is adhered to the center of the diaphragm 163 on the bottom side thereof for the purpose hereinafter described. This laminated material is formed with a number of concentric, annular corrugations 175 to permit expansion as hereinafter described.

The filled and completed ampoule 160 and the needle 164 may then be assembled in the outer plastic or rubber shell 166. Finally, a rigid, deeply cupped shell 177, preferably made of a hard plastic and containing a soft plug 178 in the bottom thereof, is filled with an antiseptic fluid 179. The shell 178 is snapped into place and heat sealed around its neck 180 to the outer ampoule cover 166.

The syringe of Figs. 18–21 is used similarly to those of Figs. 12–16, except that the ampoule need be only partially collapsed by lateral pressure as indicated by arrows in Fig. 21. The slight collapsing shown in Fig. 21 deforms the portion of the ampoule shell forming the fluid compartment 161 toward the pointed butt end 165 of the needle until the needle punctures this shell. This releases the fluid for flow through the needle 164 and permits the gas in the compartment 162 to expand the corrugated diaphragm 163 until it conforms generally to the contour of the wall of the injection fluid compartment 161, thus automatically forcing substantially all of the injection fluid out through the needle 164.

When the diaphragm 163 has expanded to the fullest extent required, it may touch the pointed butt end 165 of the needle 164. To guard against the possibility of the diaphragm 163 being completely punctured in such a case, which would also release the gas for flow through the needle 164, the pad 174 is provided as described above. By making the pad 174 of sufficiently hard rubber or other material of sufficient thickness, it can be made to resist complete penetration of the diaphragm by limiting expansion of the diaphragm against the point 165, as shown in Fig. 21.

This last embodiment of the invention, though it employs a gas under pressure to exhaust the injection fluid from the ampoule, is otherwise very similar in construction to the devices of Figs. 12–17, and is obviously susceptible to many of the same structural variations. It possesses great advantages over prior gas actuated devices in that it may be disposed at any angle in use with equal effectiveness and never injects any of the working gas or frangible glass particles into the patient.

From the foregoing description of the structure, method of manufacture and use of a variety of forms of injection devices, it will be appreciated that the basic principles of the invention common to the various devices are applicable in many different ways to the injection of fluids of all kinds through penetrable walls or membranes. The invention is not intended to be limited to the particular structural details and methods of manufacture selectively disclosed herein to illustrate presently preferred forms of the invention, but is intended to include the many variations thereof within the scope of the appended claims that will occur to those skilled in the art.

Having disclosed my invention, I claim:

1. A hypodermic syringe comprising a cup-shaped shell of non-frangible material including a thin, collapsible side wall merging into a relatively thick, rigid end wall and closed at its opposite end by a generally flat end wall to form a fluid reservoir, a hypodermic needle disposed entirely within the shell with its butt end positioned adjacent said thick, rigid end wall and its outlet end directed toward and disposed close to said generally flat end wall, and a passage leading from said reservoir into said needle adjacent the butt end thereof, said generally flat end wall beign sufficiently thin and soft at least in the region directly opposite the outlet end of said needle to be readily penetrated thereby when the thin side wall of the shell is collapsed by forcing said end walls toward each other.

2. A hypodermic syringe according to claim 1 in which the side wall of said shell tapers in thickness from said thick, rigid end wall toward said opposite end wall.

3. A hypodermic syringe according to claim 1 in which the side wall of said shell tapers in thickness from said thick, rigid end wall to its juncture with said opposite end wall.

4. A hypodermic syringe comprising a cup-shaped shell of non-frangible material including a thin, collapsible side wall merging into a relatively thick, rigid end wall and closed by a generally flat, opposite end wall to form a fluid reservoir, a hypodermic needle disposed entirely within the shell with its butt end positioned adjacent said thick, rigid, end wall and its outlet end directed toward and disposed close to said generally flat end wall, a passage leading from said reservoir into said needle adjacent the butt end thereof, said generally flat end wall being sufficiently thin and soft at least in the region directly opposite the outlet end of said needle to be readily penetrated thereby when the side wall of the shell is collapsed by forcing said end walls toward each other, and a layer of soft, rubber-like material on said generally flat end wall directly opposite the outlet end of said needle for sealing around the needle as the needle is forced therethrough.

5. A hypodermic syringe comprising a cup-shaped shell of non-frangible material including a thin, collapsible side wall merging into a relatively thick, rigid end wall and closed by a generally flat, opposite end wall to form a fluid reservoir, a hypodermic needle disposed entirely within the shell with its butt end rigidly attached to said thick, rigid end wall and its outlet end directed toward and disposed close to said generally flat end wall, and a passage leading from said reservoir into said needle adjacent the butt end thereof, said generally flat end wall being sufficiently thin and soft at least in the region directly opposite the outlet end of said needle to be readily penetrated thereby when the side wall of the shell is collapsed by forcing said end walls toward each other, a layer of soft, rubber-like material on said generally flat end wall directly opposite the outlet end of said needle, and an outer layer of flexible sheet material on said generally flat end wall removably held thereto by a pressure sensitive adhesive coating on said sheet material.

6. A hypodermic syringe comprising a cup-shaped shell of non-frangible material including a thin, collapsible side wall merging into a relatively thick, rigid end wall and closed by a generally flat, opposite end wall to form a reservoir containing a fluid medicament to be injected, a hypodermic needle disposed entirely within the shell with its butt end rigidly attached to said thick, rigid end wall and its outlet end directed toward and disposed close to said generally flat end wall, and a passage leading from said reservoir into the bore of said needle adjacent the butt end thereof, said generally flat end wall being sufficiently thin and soft at least in the region directly opposite the outlet end of said needle to be readily penetrated thereby when the side wall of the shell is collapsed by forcing said end walls toward each other, a layer of soft, rubber-like material on said generally flat end wall directly opposite the outlet end of said needle, an outer layer of flexible sheet material on said generally flat end wall removably held thereto by a pressure sensitive adhesive coating on said sheet material, and indicia on the outer surface of said sheet material identifying said medicament.

7. A hypodermic syringe comprising a cup-shaped shell of non-frangible material including a thin, collapsible side wall merging into a relatively thick, rigid end wall and closed by a generally flat, opposite end wall to form a fluid reservoir, a hypodermic needle disposed entirely within the shell with its butt end rigidly attached to said thick, rigid end wall and its outlet end directed toward and disposed close to said generally flat end wall, and a passage leading from said reservoir into said needle adjacent the butt end thereof, said generally flat end wall being sufficiently thin and soft at least in the region directly opposite the outlet end of said needle to be readily penetrated thereby when the side wall of the shell is collapsed by forcing said end walls toward each other, a layer of soft, rubber-like material on said generally flat end wall directly opposite the outlet end of said needle, an outer layer of flexible sheet material on said generally flat end wall removably held thereto by a pressure sensitive adhesive coating on said sheet material, and a film of an antiseptic ointment between said soft rubber-like material and said sheet material.

8. A hypodermic syringe comprising a shell defining a closed fluid reservoir having at least one relatively rigid end wall and flexible side walls permitting longitudinal collapsing of said shell, a hypodermic needle disposed within said shell, the butt end of said needle being rigidly secured to said rigid end wall and the opposite end of said needle being pointed and directed toward the opposite end wall, an opening from said reservoir into said needle adjacent the butt end thereof, and said opposite end wall, at least in the area opposite the point of said needle, being sufficiently soft to be easily punctured by said needle when the syringe is collapsed longitudinally to drive the needle through said easily punctured area.

9. A syringe according to claim 8 including means on said easily punctured area in the path of the point of the needle enclosing an antiseptic medium.

10. A syringe according to claim 8 in which the flexible side wall portions of said shell are corrugated to facilitate longitudinal collapsing of the shell.

11. A hypodermic syringe comprising a non-frangible, collapsible shell defining a closed fluid reservoir, one end portion of said shell being relatively thick and rigid, a hypodermic needle disposed entirely within the shell with its butt end secured to and held by said relatively rigid end portion and its outlet end directed toward the opposite end of the shell, an opening from said reservoir into the bore of said needle adjacent the butt end thereof, at least the portion of the wall of said opposite end of said shell directly opposite the outlet end of said needle being disposed close thereto and being thin relative to said rigid end portion and sufficiently soft to be readily penetrated by the needle, and the side walls of said shell between the opposite ends thereof being thin relative to said rigid end wall portion for easy collapsing.

12. A hypodermic syringe according to claim 11 in which the opening into the bore of said needle adjacent the butt end thereof is closed by a relatively weak partition selected to rupture under pressure insufficient to rupture said shell.

13. A hypodermic syringe according to claim 11 in which the opening into the bore of said needle adjacent the butt end thereof is closed by a relatively weak partition selected to rupture under pressure insufficient to rupture said shell, and the portion of the wall of said opposite end of said shell directly opposite the outlet end of said needle is of reduced thickness relative to the surrounding portions thereof to facilitate its being punctured by said needle.

14. A hypodermic syringe according to claim 1 in which the side wall of said shell converges from said generally flat end wall toward said thick rigid end wall.

15. A hypodermic syringe according to claim 1 in which the side wall of said shell is generally frustroconical in shape with a number of circumferentially extending corrugations formed therein to facilitate collapsing thereof in an axial direction.

16. A hypodermic syringe according to claim 1 in which a layer of flexible sheet material having a layer of pressure sensitive adhesive thereon is removably adhered to said generally flat end wall.

17. A hypodermic syringe according to claim 1 in which a layer of flexible sheet material having a layer of pressure sensitive adhesive thereon is removably adhered to said generally flat end wall, and indicia identifying contents of the syringe are carried by said flexible sheet material on at least one side thereof.

18. A hypodermic syringe according to claim 1 in which a layer of flexible sheet material having a layer of pressure sensitive adhesive thereon is removably adhered to said generally flat end wall, and a quantity of an antiseptic material is disposed between said generally flat end wall and said flexible sheet material.

19. A hypodermic syringe according to claim 1 in which a layer of flexible sheet material having a layer of pressure sensitive adhesive thereon is removably adhered to said generally flat end wall, for use as a bandage, and a marking means is disposed between said flat end wall and said flexible sheet material and protected by the latter for applying a selected mark to the skin of a user of the syringe and thereby evidencing use of the syringe independently of the bandage.

20. A hypodermic syringe comprising an integrally formed cup-shaped shell of non-frangible material defining a fluid reservoir, said shell being closed by a generally flat end wall sealed thereto around the periphery thereof and having a relatively thin side wall that is readily collapsible by axially directed pressure at opposite ends of the syringe and having a thicker and more rigid bottom end portion for supporting a hypodermic needle, a hypodermic needle disposed within said shell, said needle having its butt end secured to and supported by said bottom end portion and having its outlet end directed axially of said shell toward and disposed close to said flat end wall, and an inlet passage from said reservoir into said needle adjacent the butt end thereof, said flat end wall being sufficiently thin and soft at least in the region opposite the outlet end of said needle to be readily penetrated thereby when said shell is collapsed by axially directed pressure at opposite ends thereof.

21. A hypodermic syringe comprising a cup-shaped shell of non-frangible material including a thin, collapsible side wall merging into a relatively thick, rigid end wall and closed at its opposite end by a generally flat end wall to form a closed fluid reservoir, a fluid medicament confined in said reservoir, a hypodermic needle disposed entirely within the shell with its butt end positioned adjacent said thick, rigid end wall and its outlet end directed toward and disposed close to said generally flat end wall, and a passage leading from said reservoir into said needle adjacent the butt end thereof, whereby said fluid medicament may flow from said reservoir into said needle through the butt end thereof, said generally flat end wall being sufficiently thin and soft at least in the region directly opposite the outlet end of said needle to be readily penetrated thereby when the thin side wall of the shell is collapsed by forcing said end walls toward each other for exposing the outlet end of said needle and forcing said fluid medicament out of said reservoir through said needle.

22. A hypodermic syringe according to claim 21 in which a layer of flexible sheet material having a layer of pressure sensitive adhesive thereon is removably adhered to said generally flat end wall.

23. A hypodermic syringe according to claim 21 in which a layer of flexible sheet material having a layer of pressure sensitive adhesive thereon is removably adhered to said generally flat end wall, and indicia identifying said fluid medicament are carried by said flexible sheet material on at least one side thereof.

24. A hypodermic syringe comprising a non-frangible, collapsible shell defining a closed reservoir containing a fluid medicament, one end portion of said shell being relatively thick and rigid, a hypodermic needle disposed entirely within the shell with its butt end secured to and held by said relatively rigid end portion of said shell and the outlet end of said needle being directed toward the opposite end of the shell, an opening from said reservoir through which said fluid medicament may freely flow into the bore of said needle, at least the portion of the wall of said opposite end of said shell directly opposite the outlet end of said needle being disposed close thereto and being thin relative to said rigid end portion and sufficiently soft to be readily penetrated by the needle, and the side walls of said shell between the opposite ends thereof being thin relative to said rigid end wall portion for easy collapsing.

25. A hypodermic syringe comprising an integrally formed cup-shaped shell of non-frangible material defining a fluid reservoir, a fluid medicament in said shell, and a generally flat end wall sealed to said shell around the periphery thereof for closing the same and confining said fluid medicament therein, said shell having a relatively thin side wall that is readily collapsible by axially directed pressure at opposite ends of the syringe and having a thicker and more rigid bottom end portion for supporting a hypodermic needle, a hypodermic needle disposed within said shell, said needle having its butt end secured to and supported by said bottom end portion and having its outlet end directed axially of said shell toward and disposed close to said flat end wall, and an inlet passage from said reservoir into said needle adjacent the butt end thereof, whereby said fluid medicament may flow from said reservoir into said needle through the butt end thereof, said flat end wall being sufficiently thin and soft at least in the region opposite the outlet end of said needle to be readily penetrated thereby when said shell is collapsed by axially directed pressure at opposite ends thereof.

References Cited in the file of this patent

UNITED STATES PATENTS

| Number | Name | Date |
|---|---|---|
| 730,596 | Baker | June 9, 1903 |
| 877,946 | Overton | Feb. 4, 1908 |
| 1,455,047 | Goold | May 15, 1923 |
| 1,715,771 | MacGregor | June 4, 1929 |
| 2,300,066 | Schwab | Oct. 27, 1942 |
| 2,388,323 | Henderson | Nov. 6, 1945 |
| 2,403,074 | Goldsmith | July 2, 1946 |
| 2,435,251 | Tome | Feb. 3, 1948 |
| 2,512,568 | Saffir | June 20, 1950 |

FOREIGN PATENTS

| Number | Country | Date |
|---|---|---|
| 84,899 | Germany | Jan. 22, 1896 |
| 246,840 | Switzerland | Oct. 16, 1947 |